M. S. BEATON AND S. YOUNGSON.
ROCK DRILL HOSE CONNECTION.
APPLICATION FILED AUG. 15, 1916.
1,304,248.
Patented May 20, 1919.
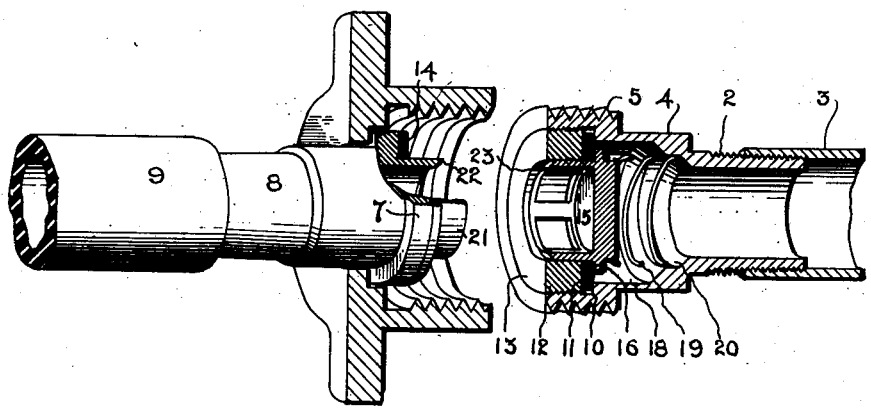
INVENTORS
Malcolm Stewart Beaton
Stewart Youngson
BY
ATTORNEYS

UNITED STATES PATENT OFFICE.

MALCOLM S. BEATON, OF JEPPESTOWN, AND STEWART YOUNGSON, OF CITY DEEP, JOHANNESBURG, TRANSVAAL, SOUTH AFRICA.

ROCK-DRILL-HOSE CONNECTION.

1,304,248.

Specification of Letters Patent.

Patented May 20, 1919.

Application filed August 15, 1916. Serial No. 114,984.

*To all whom it may concern:*

Be it known that we, MALCOLM STEWART BEATON, subject of the King of Great Britain, residing at 4 Hanan street, Jeppestown, Johannesburg, Transvaal, Province of the Union of South Africa, and STEWART YOUNGSON, subject of the King of Great Britain, residing at City Deep, Johannesburg, Transvaal, Union of South Africa, have invented certain new and useful Improvements in Rock-Drill-Hose Connections, of which the following is a specification.

The present invention has reference to the means for connecting the air or water hose of a rock drill to its supply pipe; the object being to provide an improved construction of such means embodying a valve which tends to close automatically to stop or limit the flow of fluid when the connection is broken, and which is opened by the act of making the connection.

The accompanying drawing exhibits the device partly sectioned.

1 indicates a standard rock drill spud threaded at the end 2 for screwing into the supply pipe 3. Midway it is formed with a hexagonal surface 4 for a spanner. Its other end carries a coarse thread 5 for engagement by the union nut 6 which is rotatably mounted upon and engages the collar 7 of the hose stem 8. The latter is fitted to the hose 9 which conveys the air or water to the drill.

Internally the spud is formed with a recess 10 in which a leather or similar valve seat 11 is removably held by a ring 12 which is screwed or otherwise secured in the recess. The face 13 of said ring 12 forms the seating surface between which and the face of the collar 7 of the hose stem the gasket 14 is compressed when the union nut 6 is screwed up to the spud.

The valve 15 has a flat face 16 to bear against the seating 11 and a tubular ported stem 17 which projects into the interior of the ring 12. It moves within a recess 18 somewhat smaller than the recess 10; and there is usually a valve closing spring 19 which bears against the end of a still smaller recess 20.

The hose stem is formed with an elongated extension 21, which, when the parts are coupled up, engages the valve stem 17 and, forcing the valve off its seat, permits fluid from the supply pipe 3 to pass to the hose 9. Upon breaking the connection, the valve closes. The edges of the valve stem and the extension 21 of the hose stem are made complementarily conical as shown to grip slightly on one another so that the withdrawal of the valve stem positively brings the valve to its seat.

We claim—

1. The combination of a drill spud consisting of a tubular member having one end screw threaded for connection with a supply pipe, the opposite end enlarged and provided with a coarse external thread adapted to be engaged by a union nut, and an intermediate polygonal portion to receive a spanner, the enlarged end having an internal recess, a removable annular valve seat within said internal recess, a ring engaging said valve seat and retaining it within the recess, a valve comprising a flanged head engaging said valve seat and a perforated tubular stem slidably fitting within the aforesaid valve seat and retaining ring, the free end of said stem lying within the outer face of the ring, a tubular stem adapted to be fitted to a flexible hose, a tubular extension projecting from its forward end and adapted to enter the aforesaid retaining ring and engage the free end of the valve stem to unseat the valve, an annular collar carried by the stem, and a union nut having a shouldered central opening rotatably engaging the collar on the stem, and an internally coarsely threaded recess adapted to engage the coarsely externally threaded enlarged end of the spud.

2. The combination of a drill spud consisting of a tubular member having one end screw threaded for connection with a supply pipe, the opposite end expanded and having a coarse external thread thereon, a polygonal intermediate portion to receive a spanner, the expanded end having an internal threaded recess ending in a shoulder, a removable annular valve seat within the recess and abutting the shoulder, an externally threaded ring within the recess and retaining the valve seat against the shoulder, a second recess at the rear of the first mentioned recess and of less diameter than said first mentioned recess, a valve adapted to move in said second recess, having an annular flange adapted to engage the removable valve seat, and perforated tubular stem projecting forwardly and slidably fitting within the valve seat and retaining ring, the free edge of the valve stem being beveled, spring means held within the second recess and engaging the valve to normally hold it to its seat, a tubular stem adapted to be fitted to a flexible hose, a tubular extension projecting forwardly from said tubular stem, the free end of said extension being beveled to mate with the beveled free end of the valve stem, which it is adapted to engage within the retaining ring, an annular collar projecting from the stem at the rear of the tubular extension, and a union nut rotatably engaging said collar and having a forwardly projecting annular flange coarsely threaded internally to engage the externally threaded expanded end of the spud.

In testimony whereof we affix our signatures.

M. S. BEATON.
S. YOUNGSON.